Aug. 9, 1949.  T. MADSEN  2,478,294
PISTONS FOR COMBUSTION, STEAM AND OTHER ENGINES
Filed Oct. 22, 1945
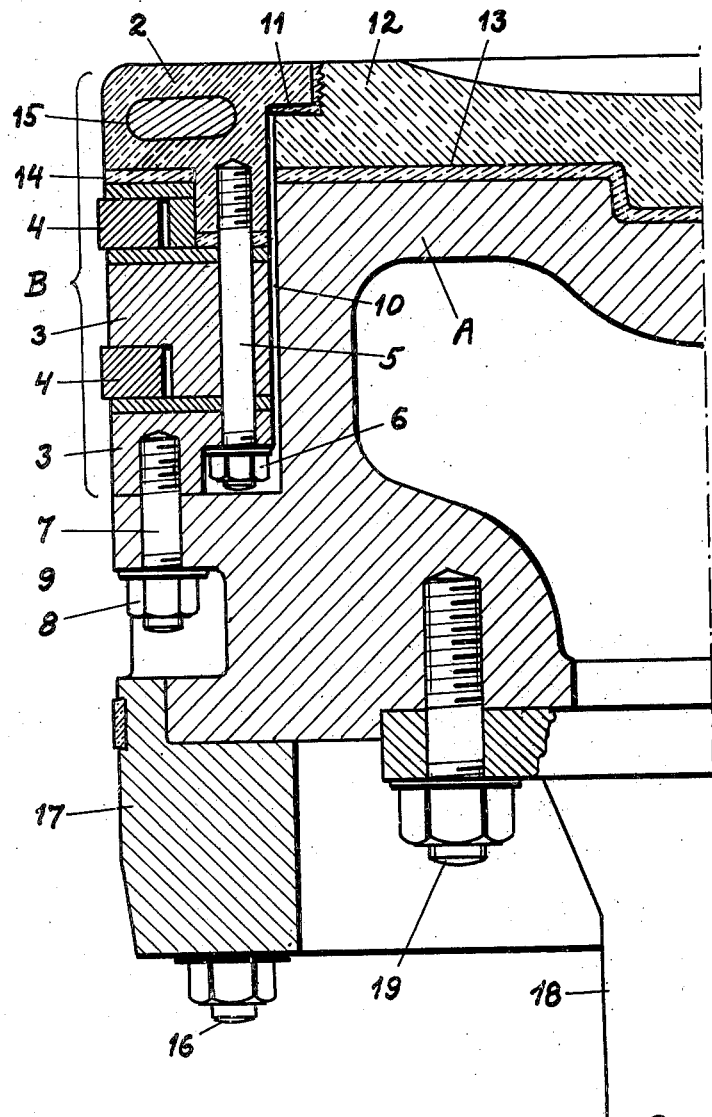

Patented Aug. 9, 1949

2,478,294

UNITED STATES PATENT OFFICE 2,478,294

PISTONS FOR COMBUSTION, STEAM, AND OTHER ENGINES

Tage Madsen, Goteborg, Sweden

Application October 22, 1945, Serial No. 623,805
In Sweden August 29, 1945

5 Claims. (Cl. 309—14)

This invention has for its object to facilitate exchange of piston rings and repair of the sealing part of the piston when necessary.

Another object is to improve the cooling conditions of the piston to meet the demands of higher working pressure and temperature, especially in combustion engines.

A further object of the invention is to provide for the use of piston rings of an especially large radial thickness.

According to the present invention the improvements will be attained by making the piston in two pieces, one of them, the sealing part, containing the sealing elements and concentrically surrounding and resting upon the central part of the piston body. A preferable form of the piston will be had when the sealing part is built up of several components, namely one top ring, which together with the top of the central part forms the top of the piston, and further a number of intermediate rings forming the grooves for the piston rings, and a number of stud bolts fixed in the top ring and holding all the components and the piston rings together in one unit.

In order that the invention may be clearly understood and readily carried out for practical purpose, reference is made in the following description to the accompanying drawing, where an axial section of one half of a piston is shown.

The piston consists substantially of a piston body A and an annular sealing part B surrounding the central part A. The sealing part B consists of a top ring 2 and a plurality of intermediate rings 3 forming grooves for piston rings 4. All these rings are held together by means of stud bolts 5 which are screwed into the top ring 2 and are provided with nuts 6 which are countersunk into the lowermost intermediate ring 3. Said ring 3 is also a hold for other stud bolts 7 which by means of their nuts 8 keep the part B firmly on or to a collar or shelf 9 formed on the central part A. The sealing part B thus constitutes a compact unit which can easily be put on and taken off from the central part A. This is of special importance on board a motorship where many pistons have to be inspected and repaired, and especially so when the possibilities of repair are small. Preferably all the worn parts B should be taken off and replaced by new complete spare parts B.

The piston in question brings also other advantages, among others also a better conveyance of heat to the cooled cylinder wall through the piston rings from the sealing part, which has become heated from the combustion gases in a combustion engine. All of which is furthered when the piston rings are placed near the top of the piston.

The details of the piston here described may vary for different kinds of piston engines. In case the piston is to be used in a gasoline engine and a relatively cool piston is wanted, said piston may be cooled and for this purpose provided with cooling ribs inside. In other combustion engines such as Diesel engines the central part A may be partly or completely heat insulated from the rest of the piston. That may be done by providing an air space 10 between the units A and B and putting an insulating element 11 between the top ring 2 and the central part A to prevent combustion gases and residues to enter there. The top 12 of the central part A may also be heat insulated from the rest of that body, for instance by putting an insulating layer 13 therebetween. In still other cases a heat insulation 14 may be put also below the top ring 2. In this case the tops 2 and 12 may be made in one piece. In these cases when the tops are insulated, they may be made of material having a low coefficient thermal conduction. The top ring 2 may consist of a material which is highly heat conducting or be provided with a cavity 15 to be filled with such a material.

On account thereof that the sealing part B is built up from parts, it will be possible to give the piston rings 4 a comparatively larger thickness in radial direction, whereby a high and constant pressure against the cylinder wall will be attained.

The piston is shown to be provided at its lower end of the central part A with a ring 17 of the diameter of the piston fixed by bolts 16. Oil scraping rings may be arranged as usual. A piston rod 18 is by means of bolts 19 fixed to the central part A.

Pistons according to the invention can be made lighter than those hitherto used, for the reason that the number of piston rings can be smaller and the piston thereby shorter. Also the piston guide becomes shorter for the reason that the piston play can be reduced. This contributes to the result of a lower, lighter and cheaper engine.

I claim:

1. A piston for combustion, steam and other engines, comprising a central part fixed to a piston rod and a sealing part concentrically surrounding the central part and being built up of intermediate rings forming recesses for piston rings, the intermediate rings being held together by a plurality of stud bolts, the sealing part being detachable from the central part as a unit and fixed to same at points on said sealing part remote from the top of the piston.

2. A piston for combustion, steam and other engines, comprising a central part fixed to a piston rod and a sealing part concentrically surrounding the central part and being built up of intermediate rings forming recesses for piston rings, the sealing part comprising a top ring, which together with the top of the central part forms the top of the piston, the intermediate rings being held together by a plurality of stud bolts fixed in the top ring, the sealing part being detachable from the central part as a unit and fixed to same at points on said sealing part remote from the top of the piston.

3. A piston for combustion, steam and other engines, comprising a central part fixed to a piston rod and a sealing part concentrically surrounding the central part and being built up of intermediate rings forming recesses for piston rings, the sealing part comprising a top ring, which together with the top of the central part forms the top of the piston, the intermediate rings being held together by a plurality of stud bolts fixed in the top ring, the sealing part being detachable from the central part as a unit and fixed to same at points on said sealing part remote from the top of the piston, and the top of the sealing part being heat insulated from the rest of said part.

4. A piston for combustion, steam and other engines, comprising a central part fixed to a piston rod and a sealing part on said central part, said sealing part comprising annular members forming recesses for piston rings, one of said annular members at one end of said sealing part forming with the top of said central part the top of the piston, said annular members being held together by a plurality of stud bolts fixed in said annular member at one end of said sealing part, the sealing part being detachable from the central part as a unit and fixed to said central part at points on said sealing part remote from the top of the piston and a sealing element between said annular member at one end of the sealing part and said central part to prevent gases and residues from penetrating between said central part and sealing part.

5. A piston for combustion, steam and other engines, comprising a central part fixed to a piston rod and a sealing part on said central part comprising annular members forming recesses for piston rings, one of said annular members at one end of said sealing part together with the top of said central part forming the top of the piston, a plurality of stud bolts fixed in said annular member at one end of said sealing part holding said annular members together, the sealing part being detachable from the central part as a unit and being fixed to said central part at points on said sealing part remote from the top of the piston, a sealing element located between said sealing part and said central part to prevent gases and residues from penetrating between said sealing part and central part, and the top of the central part being heat insulated from the rest of said part.

TAGE MADSEN.

REFERENCES CITED

The following references are of record in the file of this patent:

UNITED STATES PATENTS

| Number | Name | Date |
|---|---|---|
| 876,853 | Wille | Jan. 14, 1908 |
| 1,014,782 | Smith | Jan. 16, 1912 |
| 1,428,552 | Mullern | Sept. 12, 1922 |
| 1,686,357 | Williams | Oct. 2, 1928 |
| 1,825,163 | Schweter | Sept. 29, 1931 |
| 2,069,437 | Frank | Feb. 2, 1937 |
| 2,145,029 | Moseley | Jan. 24, 1939 |
| 2,266,192 | Grieshaber | Dec. 16, 1941 |

FOREIGN PATENTS

| Number | Country | Date |
|---|---|---|
| 204,844 | Great Britain | Oct. 11, 1923 |
| 498,455 | Great Britain | Jan. 9, 1939 |